United States Patent [19]

Hirosawa et al.

[11] Patent Number: 5,347,646
[45] Date of Patent: Sep. 13, 1994

[54] REMOTE OPERATION CONTROL FOR COMPUTER SYSTEM

[75] Inventors: Toshio Hirosawa, Machida; Jun'ichi Kurihara, Mitaka; Ikuo Kimura, Yamato, all of Japan

[73] Assignee: Hitachi, Ltd., Tokyo, Japan

[21] Appl. No.: 412,928

[22] Filed: Sep. 26, 1989

[30] Foreign Application Priority Data

Sep. 28, 1988 [JP] Japan ................ 63-240981

[51] Int. Cl.$^5$ ............................................. G06F 11/00
[52] U.S. Cl. .................................. 395/575; 371/15.1; 371/17; 379/102; 379/106; 379/95
[58] Field of Search ............... 364/200, 900; 371/15.1, 371/16.1, 16.4, 16.5, 17, 18, 29.1; 379/102, 106, 95; 395/575

[56] References Cited

U.S. PATENT DOCUMENTS

| | | | |
|---|---|---|---|
| 3,916,177 | 10/1975 | Greenwald | 371/16.1 |
| 4,390,953 | 6/1983 | Johnstone | 364/900 X |
| 4,520,233 | 5/1985 | Smith . | |
| 4,695,946 | 9/1987 | Andreasen | 364/200 |
| 4,766,548 | 8/1988 | Cedrone | 379/102 X |
| 4,823,290 | 4/1989 | Fasack | 379/106 X |
| 4,823,343 | 4/1989 | Takahashi | 371/16.1 |
| 4,829,560 | 5/1989 | Evanyk | 379/106 |
| 4,893,248 | 1/1990 | Pitts | 379/106 X |
| 4,962,449 | 10/1990 | Schlesinger | 379/95 |
| 4,974,255 | 11/1990 | Defay | 379/102 X |

FOREIGN PATENT DOCUMENTS

| | | |
|---|---|---|
| 61-6426 | 2/1986 | Japan . |
| 61-250715 | 11/1986 | Japan . |
| 62-95621 | 5/1987 | Japan . |
| 62-134750 | 6/1987 | Japan . |
| 1140260 | 6/1989 | Japan . |

OTHER PUBLICATIONS

Telecommunications, Apr. 1986, "ITT Security Modem", p. 101, vol. 20, No. 4.
Electronics, Mar. 1984, "Call-Back Schemes Ward off Unwanted Access by Telephone", pp. 131–135.
IBM Program Announcement, Jun. 16, 1987, Information Systems Group, North-Central Marketing Division, South-West Marketing Division, pp. 287-235 through 287-237.

Primary Examiner—Robert W. Beausoliel
Assistant Examiner—Ly V. Hua
Attorney, Agent, or Firm—Fay, Sharpe, Beall, Fagan, Minnich & McKee

[57] ABSTRACT

A control apparatus for realizing remote operation control for a computer system is interposed between the Computer system and a master console for supervising data stream on a data transmission/reception signal line existing between the computer system and the master console. Occurrence of error in the computer system is messaged to a remote terminal through a public telecommunication line. Commands for the computer system can be inputted from the remote terminals.

77 Claims, 7 Drawing Sheets

FIG. 4

HARDWARE ERROR TABLE (HETAB) 21, 26

| FLAG STATUS OF PSW | N I A | DISPOLAL | DISPOSAL NO. |
|---|---|---|---|
| DISABLED WAIT | WAIT CODE | COMMUNICATION | 1 |
| MACHINE CHECK | — | COMMUNICATION | 2 |
| — | ENDLESS LOOP | COMMUNICATION | 3 |
| | | | |
| | | | 10 |

SOFTWARE ERROR TABLE (SETAB) 22, 24, 25

| MESSAGE ID | NUMBER | DISPOSAL | DISPOSAL NO. |
|---|---|---|---|
| JAA | 201 | COMMUNICATION | 11 |
| JBB | 4421 | RECORDING | 12 |
| | | | |
| | | | |

COMMUNICATION TABLE (COMT) 23

| DISPOSAL NO. | CONTENTS |
|---|---|
| 1 | SYSTEM WAIT |
| 2 | MACHINE CHECK |
| | ⋮ |
| 10 | |
| 11 | OS ERROR |
| 12 | |
| 40 | UNAUTHORIZED USER |
| 50 | AUTHORIZED USER, WAIT BY CUTTING THE PHONE |

TO VOICE GENERATOR 130

FIG. 5

AUTHORIZED USER TABLE (AUT) 9

| ORDER | NAME | TELEPHONE NUMBER | AUTHORIZATION LEVEL | ATTRIBUTE | ID INFORMATION |
|---|---|---|---|---|---|
| 1 | A | xx-xxx-xxxx | SUPERVISOR | ALLOWED TO OPERATE | ××οο |
| 2 | B | xx-ooo-oooo | MAINTENANCE PERSON | ALLOWED TO OPERATE | ×οΔΔ |
| 3 | C | ΔΔ-ΔΔΔ-ΔΔΔΔ | OPERATOR | CALL | οxΔΔ |
| 4 | D | ΔΔ-ooΔ-ΔΔoo | SYSTEM ENGINEER | COMMUNICATION | οοΔΔ |
| | | | | | |
| | | | | | |

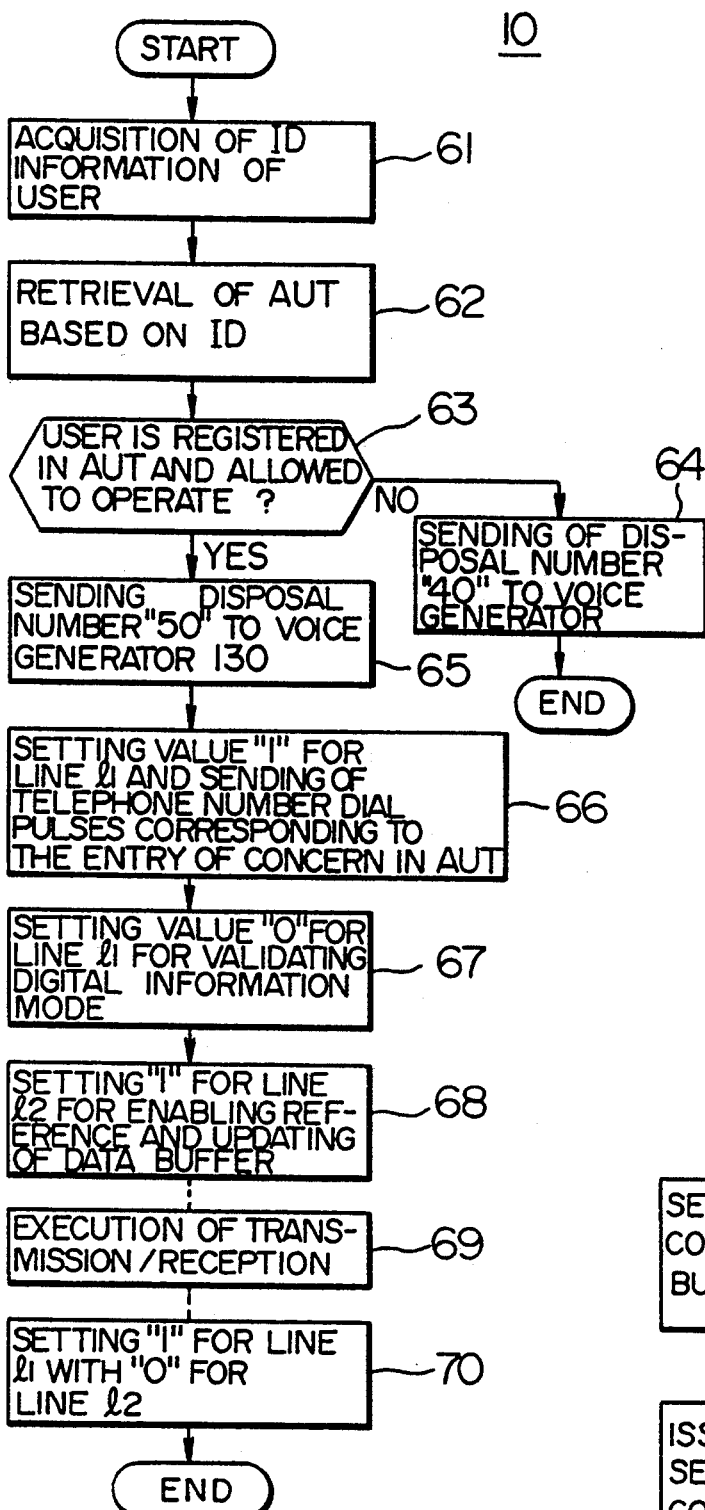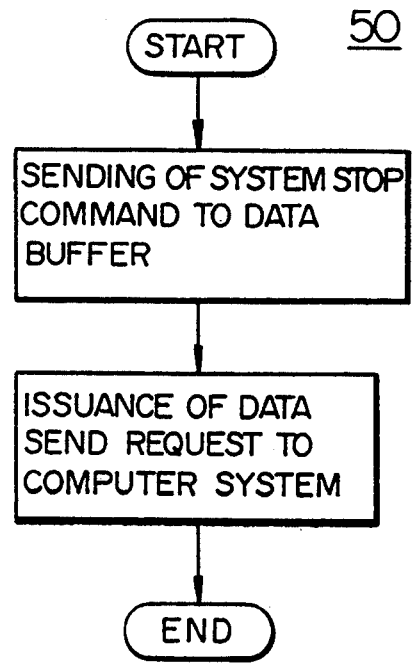

REMOTE OPERATION CONTROL FOR COMPUTER SYSTEM

BACKGROUND OF THE INVENTION

The present invention generally relates to a remote operation control for a computer system or systems. More particularly, the invention is concerned with an operation control system improved in respect to reliability, confidentiality and facility in the automatic supervision of occurrence of error or fault in the computer system or systems and automatic communication or information thereof to an operator or supervisor, as well as recognition processing of the error occurrence from a remote location.

In conjunction with 24-hour service of an information processing system, i.e. an electronic computer system, increasing difficulty is encountered in employing and keeping a required number of operators who can attend the computer system. As an attempt for making possible the unmanned operation of the computer system, there has already been proposed a control system for a network constituted by a plurality of computer systems in which the individual computer systems mutually supervise the operating state, as disclosed in Japanese Patent Publication No. 6426/1986. More specifically, according to the control technique described in this publication, the start and stop of the computer systems constituting a network is realized under the control of a supervising console by way of a public telecommunication line or network, wherein after activation, the computer systems are mutually supervised by one another and controlled by making use of a dedicated data transmission line interconnecting the computer systems.

On the other hand, as a functional means for supporting or aiding the unmanned operation of the computer system, there is known an auto-operation monitor or AOM which can operate under the control of an operating system (OS) running on a computer system, as is disclosed in "VOSS Auto-Operation Monitor", Hitachi Manual Data No. 8090-811.

The auto-operation monitor operates under the control of an operating system of a computer system for monitoring or supervising message data outputted to operator's consoles internally of the computer system to invalidate or cancel the job being executed or activating particular jobs at designated time points for thereby supporting the unmanned operation of the computer system.

The prior art system disclosed in Japanese Patent Publication No. 6426/1986 is so arranged that one of the computer systems constituting a network is activated by other one by using a public telecommunication line, wherein data for supervision are transferred through a dedicated data transmission line. It is however noted that the abovementioned publication contains neither teachings nor suggestion concerning the monitoring or supervision of occurrence of error or fault in the computer systems and the procedure or measures for disposing of error or fault as detected.

SUMMARY OF THE INVENTION

For implementing the unmanned operation and error (fault) supervision with the aid of the auto-operation monitor and error monitoring technique known heretofore with a view to reducing the number of operators by realizing the unmanned operation of the computer system, it is prerequisite that the operating systems of the computer systems and the processing program of the auto-operation monitor operate normally. Accordingly, when the monitoring function is incorporated in the computer system, erroneous operation of the associated operating system and the auto-operation monitor will render the monitoring or supervising function ineffective.

For reducing the number of operators attending the computer systems by adopting the unmanned operation procedure, there must be provided some apparatus or measures capable of performing the work carried out heretofore by the operator. The operator and the system supervisor of the computer system decide the behavior thereof by checking the messages outputted on the operator's console (also referred to as the system console). In other words, they diagnose the computer system externally thereof. Accordingly, in order to reduce the number of operators by realizing the unmanned operation of the computer system, a problem has to be solved that the function for executing the work performed heretofore by the operators and the system supervisor must be realized automatically in the computer systems. Further, a plurality of separate computer systems distributed geographically should desirably be controlled by a reduced number of persons in charge of maintenance or supervision of the computer system. To this end, such a function must be realized that an operation supervisor who is on standby at a remote location can be called only when his or her judgment or decision is required by the operating computer system. Besides, it is also important to ensure satisfactorily against illegal attempts for operating the computer system by unauthorized persons from remote locations.

An object of the present invention is to provide a control apparatus and system capable of performing the function imposed on system operators attending individual computer systems for the purpose of reducing the labor by realizing the unmanned operation of the computer systems.

Another object of the present invention is to implement the function of automatically informing a remote operation supervisor of occurrence of error or fault upon detection of the error occurring in the computer systems by a mechanism for monitoring or supervising the individual computer systems.

It is still another object of the present invention to provide a control apparatus for enabling an operation supervisor residing at a remote location to operate the computer system in response to the automatic transmission of a message informing the supervisor of an error.

It is a further object of the present invention to provide a control system which is capable of deciding whether a person attempting operation of the computer system from a remote location by way of a public telecommunication line is an authorized user or not.

Yet another object of the present invention is to provide a control system for establishing connection for communication by recalling a person trying to use the computer system through a public communication line when he or she is identified as the authorized user of the computer system.

Further, it is an object of the invention to provide a control system capable of managing operations of a plurality of computer systems distributed geographically by a reduced number of operators and maintenance persons.

For accomplishing the above objects, it is taught according to an aspect of the invention that a control apparatus realizing the remote operation control of the computer system is interposed between the computer system and the master console employed heretofore for monitoring or supervising a data stream on the signal line for data transfer between the computer system and the master console. In this conjunction, it should be mentioned that the control apparatus according to the invention can be connected together with a keyboard and a display device to the computer system in place of the conventional master console substantially to the same effect. In the description of the preferred embodiment of the invention, the above arrangement is presupposed.

The control apparatus designed to realize the remote operation control according to the invention displays message data on the display device in succession to storage of the data in a data buffer upon reception thereof from the computer system. At that time, the latest or updated message stored in the data buffer is checked as to whether it coincides with the error message registered previously, wherein occurrence of error is determined when coincidence is found. For dealing with a hardware error of the computer system, the data stream of the program status word issued by a service processor and contained in the message data coming from the computer system is checked for detecting generation of machine check and loop status of the program. Further, fault or error of such environmental equipment as an air conditioning system (e.g. abnormal temperature) is detected on the basis of the signal generated by sensors dedicated for this purpose.

Upon detection of the errors or faults mentioned above, the control apparatus realizing the remote operation control according to the invention retrieves a table registering previously the names or identifiers of users (referred to as the authorized user table or AUT) and sends out a dial pulse signal to a public telecommunication network by deriving the telephone number of the operator assigned with the highest priority. Upon establishment of connection to the station of the remote operator, a voice generator is activated to send a voice message corresponding to the species or type of the error. By virtue of this arrangement, the operator or supervisor at a remote location can recognize the occurrence of error and connect his or her personal computer to the telephone circuit.

The control apparatus realizing the remote operation control according to the invention changes over the operation of a transmitter-receiver to a digital information transmission/reception mode after the voice message has been sent. Further, for enabling the con, hand data received from the remote operator to be sent out to the computer while allowing the remote operator to receive the message data from the computer system, processing for enabling the writing and reading of the data in and from a data buffer is performed. Through such processing, the remote operator or system supervisor can operate the computer system from a remote location instead of personally going to the site where the computer system is installed for the purpose of checking the current error status, or for commanding the stop and restart of the computer system.

Further, in order to ensure confidentiality of the computer system against unauthorized attempts for operation, it is proposed according to another aspect of the invention that when an unspecified person tries to operate the computer system from a remote location by establishing connection through the public telecommunication network, the control apparatus receives among others the identification information of that person at first. This can be achieved by consulting the authorized user table to decide whether the person of concern is authorized or not. If authorized, a voice message "You are authorized. Please wait after hanging up the phone. The computer system will soon recall you." is issued by the voice generator. Subsequently, the control apparatus sends out the dial pulse signal representing the telephone number of the authorized person to the public telecommunication network to thereby establish the connection with the authorized person residing at a remote location.

According to a further aspect of the invention, the remote operator or system supervisor can perform system operation and monitoring functions for a plurality of individual computer systems dispersed geographically by way of the public telecommunication network.

The control apparatus for realizing the remote operation control of the computer system according to the invention can serve to relay and monitor the message data sent to the conventional master console from the computer system or received from the master console. Further, since the command data from the terminal of a remote operator are received intact by the computer system, the latter operates on the presumption that the transfer of message data is performed with the conventional master console. Accordingly, the conventional or existing operating system need not be modified, without any possibility of erroneous operation.

BRIEF DESCRIPTION OF THE DRAWINGS

FIG. 4 is a diagram showing a set of control tables constituting an error condition structure;

FIG. 5 is a view showing a structure of an authorized user table (AUT);

FIG. 8 is a flow chart illustrating the processing flow executed by an authorization processor; and FIG. 9 is a flow chart for illustrating processing flow for stopping the computer system spontaneously by the control apparatus (100) shown in FIG. 1.

DESCRIPTION OF THE PREFERRED EMBODIMENTS

Now, the invention will be described in detail in conjunction with preferred or exemplary embodiments thereof by reference to the accompanying drawings.

Figure 1:
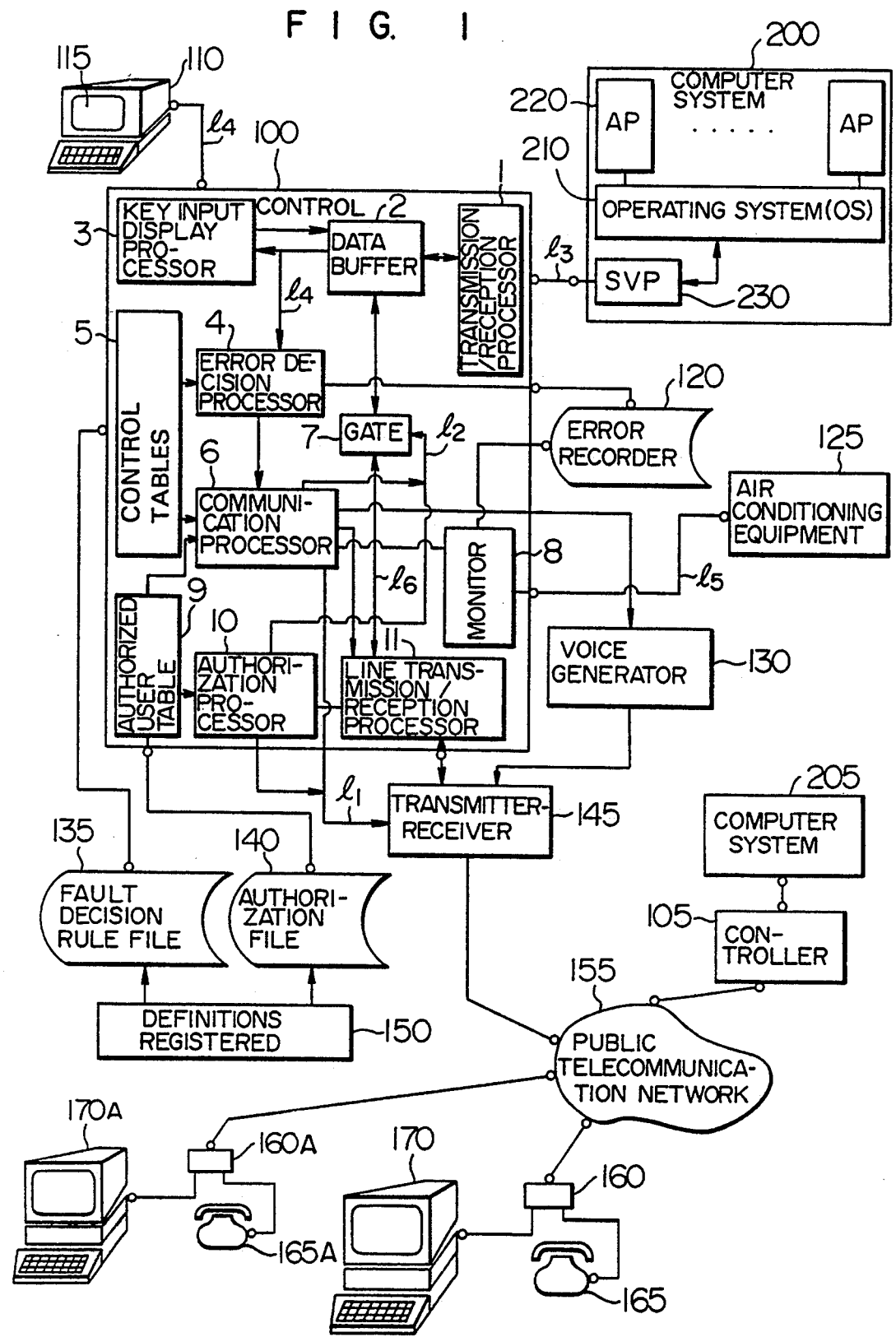
FIG. 1 is a block diagram showing a general arrangement of a remote operation control system for a computer system according to an exemplary embodiment of the invention.

Referring to FIGS. 1 to 9 and particularly to FIG. 1 which shows a general arrangement of a remote computer operation control system according to an embodiment of the present invention, reference numerals 200 and 205 denote computer systems which are to be controlled by the operation control system according to the invention. In each of the computer systems 200 and 205, an operating system or OS 210 and application programs or APs 220 can run, as shown for the computer system 200. Reference numerals 100 and 105 denote, respectively, control apparatus for implementing the remote operation control for the computer systems 200 and 205 according to the present invention. The control apparatus 100 and 105 incorporate therein a memory, an arithmetic unit and others, wherein the memory is adapted to store a set of processing programs, control tables and data buffers. Further, reference numerals 110 and 110A denote display unit equipped with keyboard input devices, and numerals 115 and 115A denote display. Numeral 120 denotes an error or trouble information record file, numeral 125 denotes air conditioning equipment, numeral 130 denotes a voice generator, numeral 135 denotes an error decision rule file, numeral 140 denotes an authorization file, numeral 145 denotes a transmitter-receiver, and numeral 150 denotes a definition registering apparatus for registering definitions in the error decision rule file 135 and the authorization file 140. Each of the elements represented by the numerals 120–150 just discussed are also provided, of course, with respect to control apparatus 105. Numeral 155 denotes a public telecommunication network, numerals 160 and 160A denote transmitter-receivers, numerals 165 and 165A denote telephone sets, and numerals 170 and 170A denote terminal for operators at remote locations. The terminals 170 and 170A may of course be realized as personal computers or the like.

The following discussion illustratively pertains to control apparatus 100. However, the operative and structural details also belong to control apparatus 105 and like control apparatus. Similarly, for purposes of illustration, certain features of the invention will be described in detail for a single example only, but, where applicable, all examples of duplicated features have corresponding structures and functions.

The control apparatus generally designated by the reference numeral 100 or 105 comprises a processor 1 for processing a data transfer such as transmission and reception of message data, command data and like information, a data buffer 2, a key input display processor 3 serving as an interface for the display device 110, an error decision processor 4, a set of control tables constituting an error condition body or structure 5, a communication processor 6, a gate processor 7 for enabling reference to and/or updating of the data placed in the data buffer 2, an environment supervision processor 8 for the air conditioning equipment 125 and the like, an authorized user table (AUT) 9, an authorization processor 10 and a line-transmission/reception processor 11.

Before entering into a detailed description of the processings shown in FIGS. 2 et seq. and performed by the associated processors, an outline of operation of the remote computer operation control system according to the invention will be described.

Referring to FIG. 1, it is first to be mentioned that any operator at a remote location or a system managing operator (supervisor) is capable of controlling the computer systems 200 and 205 with the aid of his or her terminal unit 170. In the case of the system shown in FIG. 1, two computer systems 200 and 205 are shown as the objects for the control. It should however be understood that this is only by way of example and the computer systems capable of being controlled by the present system is never limited to any specific number. For facilitating the elucidation, however, the remote operation control will be described below in conjunction with the computer system 200.

The message data indicating the operating status of the computer system 200 and that of the operating system 210 are transferred to the control apparatus 100 through the signal line 13. Upon reception of the message data by the transmission/reception processor 1 incorporated in the control apparatus 100, the processor 1 first stores the data message in the data buffer 2 and subsequently issues a data reception confirmation message to the computer system 200 through the line 13. The received message data include those corresponding to the individual regions or fields on the display screen, as is shown in FIG. 2, wherein the screen is divided into a message output field or area 13, a command input field 14 and a hardware status field. The data having the contents corresponding to the display fields are stored in the data buffer 2 and displayed on the screen of the display unit 110 by the key input display processor 3 through a signal line 14. The display unit 110 installed in the vicinity of the computer system 200 is commonly referred to as the master console 110 through which a system operator can input appropriate command data in the operator-attendant or manned operation mode. Needless to say, the command data inputted through the master console 110 are stored in the command input area 14 of the data buffer 2 by way of the signal line 14. The command data located in the command input area 14 are then sent out to the computer system 200.

Every time the message data from the computer system 200 are stored in the data buffer 2, the error decision processor 4 is activated to compare the message data stored in the message output area of the data buffer 2 and the program status word or PSW stored in the hardware status display area 15 with the error conditions registered in the control tables of the error condition structure 5 for thereby deciding whether or not any error is taking place in the computer system 200.

On the other hand, detection of the environmental error such, as trouble in the air conditioning equipment, is performed by the environment supervising processor 8 on the basis of sensor signals received through a signal line 15 representing the room temperature, water leakage and others. In any case, when the occurrence of an error is recognized, the content of the error and temporal data concerning the error are stored in the error record file 120 and subsequently transferred to the communication processor 6.

The communication processor 6 determines the message location. In this manner, it is possible to operate the computer system 200 from the remote terminal.

The procedure for making possible the system operation of the computer system 200 by the operator at a remote location or by the system supervising person upon occurrence of an error in the computer system 200 will be appreciated from the above description.

Next, description will be directed to a manipulation or operation of the computer system 200 performed spontaneously by the operator at a remote location. In the first place, the operator at the remote station issues a call to the control apparatus 100 of the computer system 200 with the aid of the telephone set 165 to send user identification information to the control apparatus 100 by pushing the dialing buttons in case the telephone set is constituted by a pushbutton type telephone. Alternatively, the user can send his or her identification information to the control apparatus through the terminal 170. In response, the authorization processor 10 incorporated in the control apparatus 100 retrieves the identification information from the authorized user table (AUT) 9 to thereby check whether or not the operator of concern is the user who is authorized to perform the system operation of the computer system 200. If the operator is not an authorized user who is registered in the authorized user table (AUT) 9 or who is registered in that table with the attribute "allowed to operate", a voice message "You are not the authorized user" is sent back through the line transmission/reception processor 11 and the voice generator 130, whereupon the connection is cut off.

On the other hand, when the addresser is the authorized user, a voice message "You are authorized. Please wait after hanging up the phone" is sent back, whereon the connection is cut off. Subsequently, the telephone number placed in the authorized user table 9 at the entry corresponding to the addressing operator is derived and the corresponding dial pulse signal is sent to the transmitter-receiver 145. By calling back in this way to the addressing operator from the site where the computer system 200 is installed, the problem of the invader (hacker) can also be solved.

Upon establishment of the interconnection with the operator at the remote station, the authorization processor 10 sets the value "1" for the signal line 12 to thereby cause the gate circuit 7 to be opened or enabled. Further, the value "0" is set for the signal line 11, whereby the operation mode of the receiver-transmitter 145 is set to digital information mode. Through the procedure described above, the content of the data buffer 2 can also be accessed from the terminal of the operator at a remote location through the line 16 and the public telecommunication network 170.

The remote operation process to the computer system 205 is similar to the process for the computer system 200. In that case, the operation can be accomplished with the aid of the terminal 170 installed at a remote location or station.

Now, the operation of the remote operation control system according to the present invention will be described in detail by reference to FIGS. 2 et seq. Illustrated in FIG. 2 are the regions or fields where the message data and the command data transferred with the computer system 200 are displayed, the data mentioned above being stored in the data buffer 2. The message data sent out from the computer system are displayed in the message output field 13 and the hardware information display field 15 shown in FIG. 2. The command data sent to the computer system 200 from the control apparatus 100 are displayed in the command input field 14, while the command data inputted through the keyboard of the display unit 110 or the command data inputted from the terminal 170 at a remote location are stored in the command storage area of the data buffer 2 to be sent out to the computer system 200. Parenthetically, the data for the hardware status display field 15 are furnished from a service processor (SVP) 230 incorporated in the computer system 200 over the line 13.

Since the line 13 is thus employed both for transmission/reception of the data for communication with the service processor and for data transfer with the master console for the operating system, the data buffer 2 can be utilized for the data transfer with the service processor 230 in case the operating system (OS) 210 does not run yet on the computer system 200. More specifically, assuming that command data commanding the loading of an initial program to the service processor 230 are inputted from the terminal at a remote location, the command data is stored in the data buffer 2 to be sent out to the computer system 200. In other words, the initial program loading to the computer system can also be commanded from the remote terminal.

Figure 2:
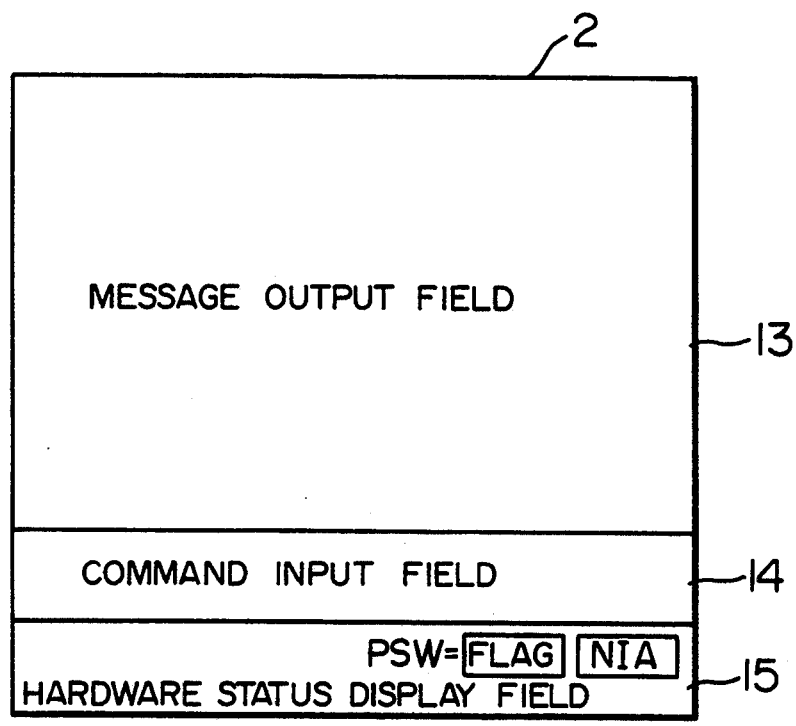
FIG. 2 is a diagram showing a structure of message data and command data stored in the data buffer (2) and displayed on the display device (115) shown in FIG. 1.
Figure 3:
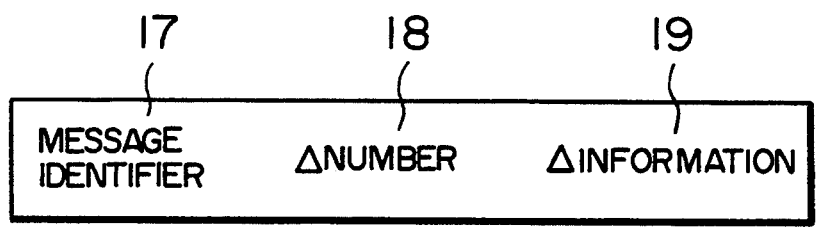
FIG. 3 is a diagram showing format of a message data.

FIG. 3 illustrates a format of the message data outputted from the computer system to the message output area 13 shown in FIG. 2. The message data are composed of a message identifier 17, a message number 18 and a detailed information field 19.

FIG. 4 illustrates a group of the control tables constituting the error condition structure 5 shown in FIG. 1. These tables include a hardware error decision rule table 21 also referred to as the hardware error table or HETAB, a software error decision rule table also referred to as the software error table or simply as SETAB, and a communication rule table also referred to as the communication table or COMT. FIG. 5 illustrates a structure of the authorized user table 9. The numbered entries of this table include the names of operators, the telephone numbers, the levels of authorization, the attributes, and identification information, each in the sequence corresponding to the priorities imparted to the corresponding messages. The originals of the control tables constituting the error condition structure 5 and the authorized user table 9 are stored in external storage equipment as an error decision rule file 135 and a recognition file 140 and adapted to be loaded into a memory incorporated in the control apparatus 100 from the external storage equipment upon activation of the control apparatus 100. It should be mentioned that the content of the error decision rule table 135 and that of the recognition file 140 can be altered with the aid of the definition registering apparatus 150.

Figure 6:
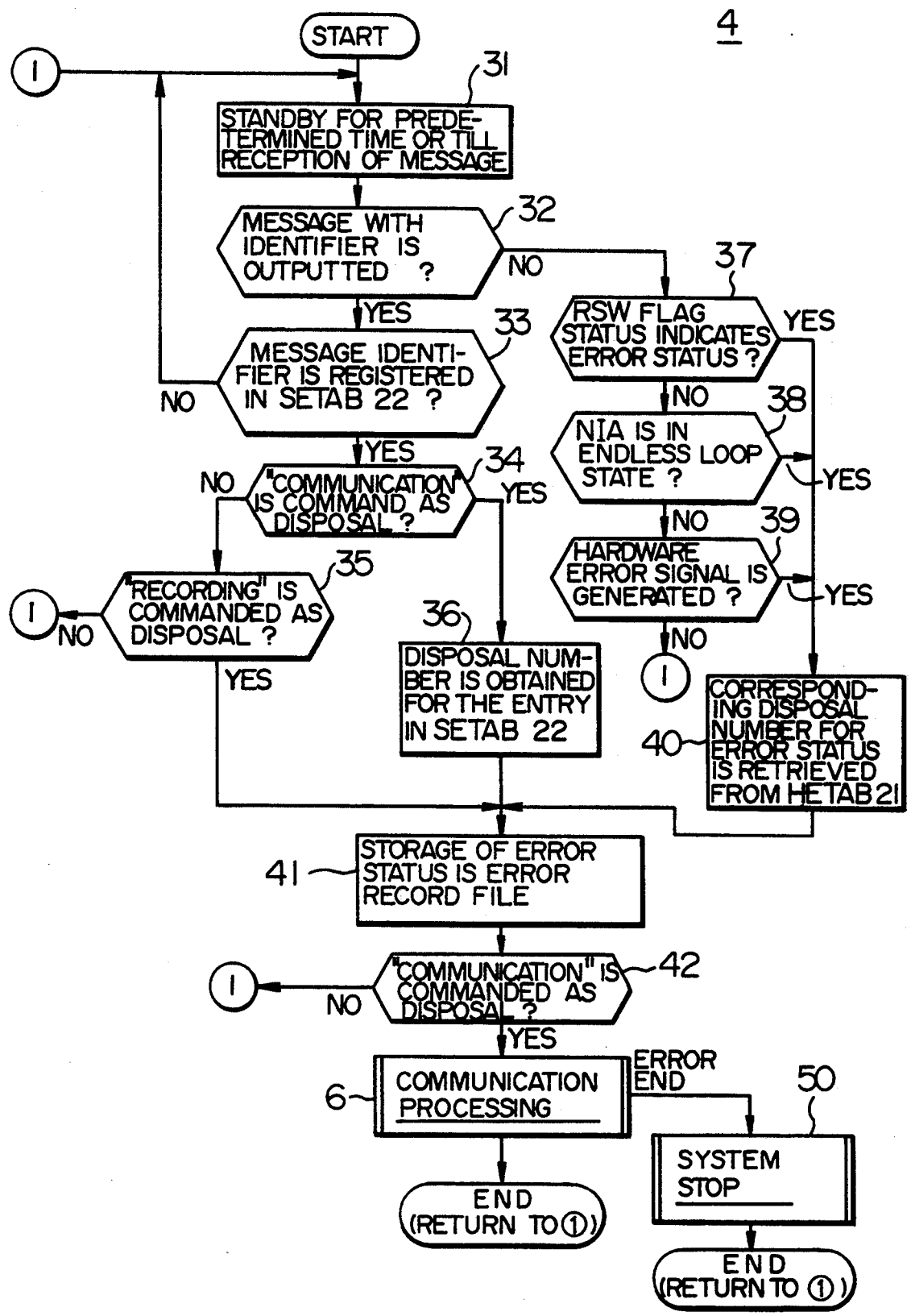
FIG. 6 is a flow chart for illustrating the processing flow executed by an error decision processor.

Now referring to FIG. 6, in step 31 the error decision processor 4 remains in the standby state until the message data are sent out to the data buffer 2 from the computer system 200. When the message data are stored in the data buffer 2 from the computer system 200, it is then checked whether the data of concern represent message data attached with the identifier issued by the operating system 210 at the decision processing step 32. If true, then processing steps 33 to 36 are executed. At first, a decision is made at processing step 33 as to whether or not the message data of concern are registered in the software error table (SETAB) 22 shown in FIG. 4. If not registered, this means that the message data are normal message data. Accordingly, the processing step 31 is resumed. On the other hand, when it are decided that the message data of concern is registered in the SETAB 22, this means that a possibility of occurrence of an error exists. Accordingly, the disposal column 24 of the table SETAB 22 is checked in step 34. When "message" is indicated in the disposal column 24 corresponding to the message data of concern, then the disposal field number 25 is determined at the processing step 36. When "message" is not designated, it is then checked whether or not the disposal field indicates "recording" at the processing step 35. When "recording" is not designated, the processing step 31 is regained. When "recording" is designated, the processing step 41 is executed.

The processing flow described above is the processing for deciding whether or not an error occurs in the software inclusive of the operating system (OS) 210. On the other hand, a decision as to occurrence of a hardware error is realized through processing steps 37 to 40. In the first place, a flag of the program status word (PSW) area 15 shown in FIG. 2 is checked at the decision step 37. If the error status is found, the processing step 40 is executed. At the decision step 38, the next instruction address (NIA) in the PSW display area 15 is checked to determine whether or not the computer system is in an endless loop status. If so, the processing step 40 is executed. At the decision step 39, it is checked whether or not a hardware error message is issued from the service processor of the computer system 200. If the error message is found, then the processing step 40 is executed. When no hardware error status is detected at any one of the decision steps 37 to 39 mentioned above, the processing step 31 is regained. At the processing step 40, the disposal identification number 26 is determined from the hardware error table (HETAB) 21.

When a software error or when a hardware error are detected, the error data is stored in the error record file 20 together with the temporal data indicating the time at which the error information was detected. Subsequently, after confirmation of a command for communication with the supervising person at the remote location at the decision step 42, the control is transferred to the communication processor 6. When the communication has ended without success, the end processing 50 is performed for the computer system by storing the data stream of the operator command for stopping operation of the computer system in the data buffer 2 and sending the data stream to the computer system 200, as shown in FIG. 9.

Figure 7:
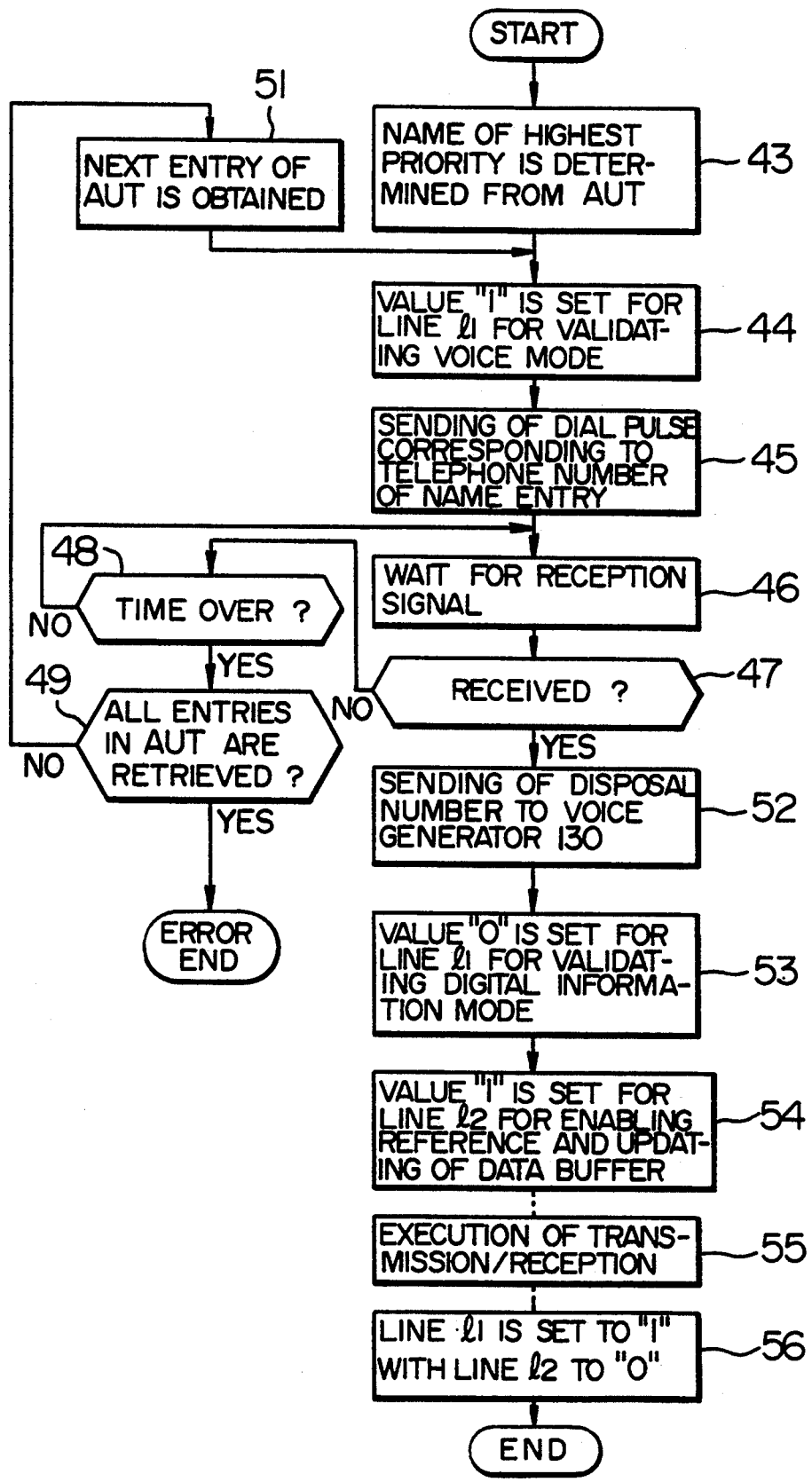
FIG. 7 is a flow chart illustrating the processing flow executed by a communication processor.

FIG. 7 shows a processing flow to be performed by the communication processor 6 shown in FIG. 1. Referring to FIG. 7, the entry of the message destination having the highest priority is determined by consulting the authorized user table (AUT) 9 shown in FIG. 5 at the processing step 43. The AUT 9 is prepared such that the entries are in the order of the priorities imparted thereto with the start entry having the highest priority.

Through the steps 44 to 51, dialing processing to the communication destination registered in the authorized user table or AUT 9 is executed.

After all the entries in the AUT 9 have been retrieved by loop 44, 45, 46, 47, 48, 49, 51 as determined at the decision step 49, error return is validated.

At the processing step 52, reached upon "reception" in step 47, the disposal identification number 25 or 26 is sent to the voice generator 130 which responds thereto by outputting a voice message corresponding to the disposal number, as shown in the communication rule table (COMT) 23 of FIG. 4. At the processing step 53, the value "0" is set for the signal line 11 and thereafter at step 54 the value "1" is set for the signal line 12 in order to enable the gate circuit 7. In this way, it becomes possible to operate the computer system from the remote terminal 170 at the processing step 55. Upon completion of operation of the computer system from the remote terminal 170, the value "1" is set for the signal line 11 with the value "0" being set for the signal line 12 to regain the initial state by step 56.

An environmental abnormal state of the air conditioning equipment 125 and the like is detected by the supervising processor 8 shown in FIG. 1. Upon detection of the environmental abnormal condition, control is transferred to the communication processor 6. In this manner, information of the abnormality to the supervising person or operator at a remote location can be realized.

Next, description will be turned to the procedure for operating the computer system spontaneously by an operator at a remote location. FIG. 8 shows a processing flow executed by the authorization processor 10 shown in FIG. 1. At first, the identification information of the user is obtained at the processing step 61 and thereafter the authorized user table (AUT) 9 is searched at the processing step 62. When the operator is not the user who is registered in the AUT 9 and who is permitted to use the computer system 200 as determined in step 63, the disposal identification number is set to the value "40" which is then sent to the voice generator 130 at step 64. In response, the voice generator 130 sends back the voice information "You are not the authorized user", as indicated by the disposal number "40" in the communication rule table (COMT) 23, whereupon the connection to the remote user is cut off.

On the other hand, when it is determined at the step 63 that the operator of concern is registered in the AUT 9 and is permitted to operate the computer system, the processing steps 65 et seq. are executed. At the step 65, the value of the disposal number is set to "50" and then sent to the voice generator 130. In response, the voice generator 130 sends back the voice message "You are an authorized user. Please wait by disconnecting the phone" as indicated by the disposal number "50" in the communication rule table (COMT) 23. Next, at the processing step 66, the connection is cut off and the telephone number registered in the AUT 9 at the corresponding entry is dialed.

As the result, the state for allowing communication with the operator is established. Then, the value "0" is set for the signal line 11 at the step 67 with the value "1" being set for the signal line 12 at the step 68. Thus, it is made possible to operate the computer system 200 from the remote terminal 170 at the step 69. Upon completion of the operation of the computer system performed by the remote terminal 170, the signal line 11 is set to "1" with the signal line 12 being set to "0" to restore the initial state at the step 70.

As will now be appreciated from the foregoing description, in the system according to the invention, the control apparatus 100 for enabling the remote operation of a computer system is interposed between the computer system and the operator's console unit which constantly supervises or monitors the message data sent out from the computer system, such that the detection of abnormal message data is informed to a supervising person or operator residing at a remote location through a public telecommunication network for thereby allowing the supervisor or operator at the remote location to control the computer system so that it can be operated. By virtue of such arrangement, elimination or reduction of labor involved in the operation of the computer system can be accomplished to advantage.

Further, the control apparatus for enabling the remote operation of the computer system plays a role as the operator at the respective computer system site, and it is possible to manage and operate a plurality of computer systems that are dispersed geographically by a small number of supervisors and apparatus, which is another advantage.

Besides, when an operator residing at a remote location is to operate the computer system by way of the public telecommunication network, an authorization check of the addressing operator is performed, wherein unless the operator is the authorized user, this fact is informed to him or her and the connection is cut off. On the other hand, when the addressing operator is the authorized user, this fact is informed and the connection is once disconnected, whereupon the dialing for recalling is performed to the user. Thus, any unauthorized invasion to the computer can be positively prevented to further advantage.

Additionally, according to the invention, it is possible for the remote operator to execute the command for loading the computer with an initialization program. In other words, it is possible to perform the initialization processing for the computer system, whereby the number of maintenance persons deployed heretofore for remote stations can be reduced to still further advantage.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A remote operation control system for a computer system, comprising:
    means for receiving message data issued from the computer system for an operator of the computer system;
    first storage means for storing error messages, each to be transmitted to the operator of the computer system at an occurrence of one error of a plurality of errors;
    second storage means for storing telephone numbers of remote apparatuses connected to a public telephone communication network, each remote apparatus including a terminal and a telephone communicator;
    error detecting means responsive to the message data received by said means for receiving for checking whether or not the received message data indicates occurrence of the one error of the plurality of errors in the computer system;
    means responsive to detection of occurrence of the one error in the computer system by said error detecting means for selecting a corresponding one of a plurality of error messages for the one error;
    means connected to said error detecting means and responsive to detection of the one error thereby for calling-up a telephone communicator of one of the remote apparatuses by way of the public telephone communication network, based upon one of the stored telephone numbers;
    means connected to the means for calling-up for sending the selected error message to the called-up telephone communicator by way of the public telephone communication network; and
    transfer control means for subsequently allowing command data and message data to be transferred between a terminal of the one of the remote apparatuses and the computer system through the public telephone communication network.

2. A remote operation control system for a computer system according to claim 1, further comprising:
    third storage means for storing message data;
    wherein said means for receiving includes means for causing the message data received from the computer system to be stored in said third storage means and for informing the computer system of completion of reception of the message data when said message data has been stored in said third storage means.

3. A remote operation control system for a computer system according to claim 1, further comprising:
    an operator console connected to said means for receiving through a line different from the public telephone communication network for displaying the message data received by the means for receiving and for inputting command data to be supplied to said computer system; and
    means connected to said operator console for transferring the command data inputted from the operator console to said computer system.

4. A remote operation control system for a computer system according to claim 1,
    wherein said second storage means further holds identifiers, each for one of the remote apparatuses and each indicative of at least one operator authorized to operate one terminal; and
    wherein said remote operation control system further includes:
    means connected to said second storage means and said public telephone communication network and responsive to calling from one of the remote apparatuses through the public telephone communication network by an operator who is requesting control of an operation of the computer system for identifying whether the identifiers held in said second storage means include one identifier which corresponds to an identifier inputted by the operator through the calling remote apparatus and supplied via the public telephone communication network;
    means connected to said means for identifying for recalling the calling remote apparatus through the public telephone communication network when the means for identifying shows that one of the stored identifiers corresponds to the inputted identifier, wherein the recall is done based upon a telephone number stored in said second storage means, for the one of the identifiers; and
    means for enabling said transfer control means to transfer, after recalling by said means for recalling, message data and command data between the computer system and the terminal of the calling remote apparatus through the public telephone communication network.

5. A remote operation control system for a computer system according to claim 1,
    wherein said error detecting means includes:
    means for detecting occurrence of a software error in the computer system, based upon whether or not the message data received from said computer system has a particular message identifier and a particular message number indicative of occurrence of a corresponding software error within an operating system which controls the computer system.

6. A remote operation control system for a computer system according to claim 1,
    wherein said error detecting means includes:
    means for detecting occurrence of a hardware error within the computer system, based upon the received message data including a program status word sent out from the computer system.

7. A remote operation control system for a computer system according to claim 6, wherein the means for detecting occurrence of a hardware error is based upon the received message data having a flag in the program status word, and further including means for detecting occurrence of a loop status of a program being executed by the computer system, based upon the received message data having a next instruction address in the program status word.

8. A remote operation control system for a computer system according to claim 1,
wherein said means for sending
sends the selected error message in the form of voice information.

9. A remote operation control system for a computer system according to claim 1, further comprising:
third storage means connected to said error detecting means and accessible from the remote apparatuses for storing error information on the one error detected by said error detecting means together with timing data indicating when the one error took place.

10. A remote operation control system for a computer system according to claim 1, including:
a service processor;
wherein said transfer control means includes means connected to the service processor within the computer system for transferring to the service processor a command required to control the service processor and supplied from the terminal of the one of the remote apparatuses via the public telephone communication network.

11. A remote operation control system for a computer system,
means connected to the computer system for detecting an environmental abnormal state of at least one of air conditioning equipment and room temperature;
storage means for storing telephone numbers of remote apparatuses connected to a telephone communication network, each remote apparatus including a telephone communicator and a terminal;
means connected to said means for detecting and said storage means and response to detection of the environmental abnormal state for calling up a telephone communicator of one of the remote apparatuses, based upon one of the telephone numbers held in said storage means;
means connected to the means for calling up for sending an error message indicative of occurrence of the environmental abnormal state to the one of the remote apparatuses by way of the network; and
transfer control means connected to said means for sending for enabling subsequent transmission of command data and message data between the one of the remote apparatuses and the computer system.

12. A remote operation control system for a computer system according to claim 11, wherein said means for sending sends the error message in the form of voice information.

13. A remote operation control system for a computer system according to claim 11, including:
a service processor;
wherein said transfer control means includes means connected to the service processor within the computer system for transferring to the service processor a command required to control the service processor and supplied from the terminal of the one of the remote apparatuses via the telephone communication network.

14. In a remote operation control system for a plurality of computer systems, the improvement comprising:
a plurality of remote apparatuses connected to the computer system via a common public telephone communication network, each remote apparatus including a telephone and a terminal, and
a plurality of control means each connected to the network and a corresponding one of the computer systems,
each control means comprising:
means for receiving message data issued from a corresponding computer system for an operator of the corresponding computer system;
first storage means for storing error messages each to be transmitted to the operator of the corresponding computer system at an occurrence of one of a plurality of errors;
second storage means for storing telephone numbers of the remote apparatuses;
error detecting means responsive to the message data received by said means for receiving for checking whether or not the received message data indicates occurrence of the one of the errors in the computer system;
means responsive to detection of occurrence of the one of the errors in the computer system by said error detecting means for selecting a corresponding one of the error messages for the one of the errors;
means connected to said error detecting means and responsive to detection of the one of the errors thereby for calling up a telephone communicator provided for one of the remote apparatuses by way of the network based upon one of the stored telephone numbers;
means connected to the means for calling-up for sending the selected one of the error messages to the one of the remote apparatuses by way of the network; and
transfer control means for subsequently allowing command data and message data to be transferred between a terminal of the one of the remote apparatuses and the computer system through the network.

15. A remote operation control system for a computer system and a telephone communication network, comprising:
means connected to the computer system and responsive to message data on an operation thereof provided by said computer system, for detecting whether or not an operation error has occurred within the computer system;
means, connected to said means for detecting and to the network and responsive to detection of an operation error by said means for detecting, for calling a telephone communicator connected to the network, said calling means being provided for a remote terminal connected to said network to inform a remote terminal operator of occurrences of the operation error; and
transfer means, connected to the computer system and the network, for transferring to the computer system operation control command data inputted subsequently by the remote terminal operator via said remote terminal and transmitted via the network, and for subsequently transferring message data on operation of the computer system to the remote terminal via the network.

16. A remote operation control system according to claim 15, wherein the network is a public telephone network.

17. A remote operation control system according to claim 15, further comprising:
 means for holding a plurality of identifying information items each corresponding to one of a plurality of operation errors of said computer system and indicative of identifying information items to be included in message data supplied by said computer system when a corresponding operation error has occurred;
 said means for detecting including means connected to said holding means for judging occurrence of an operation error within the computer system, depending upon whether the message data provided by the computer system includes one of the plurality of identifying information items.

18. A remote operation control system according to claim 15, wherein said means for detecting detects occurrence of a software error within the computer system, based upon message data generated by an operating system which controls the computer system, among a plurality of message data provided from the computer system, and detects occurrence of a hardware error within the computer system, based upon message data generated by a service processor within the computer system, among the plurality of message data provided from the computer system.

19. A remote operation control system according to claim 18, wherein said message data generated by the service processor includes information on a program status word within the computer system.

20. A remote operation control system according to claim 15, further comprising:
 means connected to the means for calling up for judging whether an error detected by said means for detecting needs to be informed to an operator and for preventing said means for calling from calling the telephone communicator when the detected error does not need to be informed to an operator.

21. A remote operation control system according to claim 20, further comprising:
 means for holding a plurality of error identifying information items and disposal information, and for including the error identifying information items and disposal information for each of the plurality of error identifying information items in message data supplied by said computer system when one of the operation errors has occurred, the disposal information indicating at least whether or not a corresponding error needs to be informed to an operator;
 said means for detecting being connected to said means for holding for judging occurrence of an error within the computer system, depending upon whether the message data provided by the computer system includes one of the plurality of error identifying information items; and
 means connected to said means for holding and said means for detecting for executing the judging, based upon disposal information held for one of the plurality of error identifying information items which has been detected by said means for detecting as being included in message data provided by said computer system.

22. A remote operation control system according to claim 20, further comprising:
 storage means, connected to said means for detecting and being accessible from said remote terminal via the network and being responsive to detection of occurrence of an error by said means for detecting, for storing error information related to an error detected by said error detecting means.

23. A remote operation control system according to claim 15, further comprising:
 an operation console connected to said computer system via a path different from the network, said operation console including an input apparatus for input of command data and a display apparatus for display of message data supplied to the operation console and command data inputted by said input apparatus; and
 connect means connected to said operation console, said computer system and said transfer means for transferring message data provided by said computer system to said operation console to be displayed by said display apparatus, and for transferring command data inputted by said input apparatus, to said computer system.

24. A remote operation control system according to claim 23, further comprising:
 interface means connected to said computer system for receiving message data provided by the computer system and for transferring command data received by the interface means to the computer system; and
 a data storage connected to said interface means for holding the message data received by said interface means;
 said transfer means transferring the message data from said data storage to said remote terminal and transferring command data inputted from the remote terminal to said data storage;
 said operation console including means connected to said data storage for transferring the received message data and the inputted command data from the data storage to said operation console and for transferring command data inputted by said input apparatus to said data storage; and
 said interface means transmitting to said computer system command data held in said data storage and inputted by one of said remote terminal and said input apparatus.

25. A remote operation control system according to claim 24, wherein said interface means is connected to said data storage for sending to the computer system a signal indicative of receipt of the message data after completion of the holding.

26. A remote operation control system for a computer system, comprising:
 means for holding a plurality of telephone numbers for telephone communicators connected to a telephone communication network and respectively provided for a plurality of predetermined remote terminals connected to the network;
 means connected to the computer system and responsive to computer system message data for detecting whether or not an operation error has occurred within the computer system;
 means connected to said means for holding and said means for detecting and being responsive to detection of occurrence of an error thereby for selecting one of the telephone numbers;

means connected to said means for selecting and to the network for calling one of said telephone communicators with the selected telephone number to inform an operator of occurrence of an operation error; and transfer means, connected to the computer system and the network, for transferring to the computer system operation control command data inputted subsequently by an operator from a remote terminal selected with the selected telephone number, and for transferring message data on an operation of the computer system provided subsequently to the selected remote terminal via the network.

27. A remote operation control system according to claim 26, wherein said means for selecting selects one of the telephone numbers based upon predetermined priorities for the remote terminals.

28. A remote operation control system according to claim 26,
wherein said means for selecting selects another of the telephone numbers when there is no response from the remote terminal corresponding to said one of the telephone numbers, selected by the means for selecting, to the calling by said means for calling;
said calling means calling the another of the telephone number sequentially.

29. A remote operation control system according to claim 28, further comprising:
means connected to said means for selecting for supplying said computer system with command data to stop the computer system when all of the plurality of telephone numbers have been sequentially selected by said means for selecting and sequentially called by said means for calling without receiving any response from any of the remote terminals corresponding to the telephone numbers.

30. A remote operation control system according to claim 26, wherein the network is a public telephone network.

31. A remote operation control system for a computer system, comprising:
means connected to the computer system and responsive to message data on an operation thereof provided thereby for detecting whether or not an error has occurred within the computer system;
means, connected to said means for detecting and to a telephone communication network and responsive to detection by said means for detecting of occurrence of an error, for calling a telephone communicator connected to the network and provided for a predetermined remote terminal connected tot he network, to inform an operator of occurrence of an error;
means for sending a voice error message to the telephone number via the network after the calling; and
transfer means connected to the computer system and the network for transferring operation control command data to the computer system, said operation control command data having been inputted by the operator through the remote terminal and transmitted via the network, and for transferring message data, on an operation of the computer system provided subsequently thereby, to the remote terminal via the network.

32. A remote operation control system according to claim 31, wherein said means for sending includes:
means for holding error messages to be supplied to an operator for different errors;
means, connected to said means for holding and to said means for detecting, for selecting one of the error messages corresponding to the error detected by said detecting means; and
means for sending the selected error message to the remote terminal corresponding to the telephone number through the network in voice form.

33. A remote operation control system according to claim 31, further comprising:
a transmitter/receiver connected to the network for operating in a selected one of a voice mode of operation for transmitting or receiving a voice, and a digital signal mode of operation for transmitting or receiving a digital signal;
wherein said means for sending includes means for generating the voice error message, and means for sending the error message to the telephone number through the network, with the transmitter/receiver in the voice mode of operation; and
wherein said transfer means includes means for receiving, via the network, the operation control command data inputted subsequently by the operator from the remote terminal using the transmitter/receiver in the digital signal mode of operation, and for transmitting the message data subsequently provided by the computer system to the network using the transmitter/receiver in the digital signal mode operation.

34. A remote operation control system according to claim 31, wherein the network is a public telephone network.

35. A remote operation control system for a computer system, comprising:
detecting means connected to the computer system and responsive to the message data on an operation thereof provided thereby for detecting whether or not an error has occurred within the computer system;
calling means connected to said detecting means and a telephone communication network and responsive to detection by said detecting means of occurrence of an error for calling a predetermined remote apparatus connected to the network;
sending means connected to said calling means for sending a message to the remote apparatus to inform an operator of occurrence of an error; and
transfer means connected to the computer system and the network for receiving, through the network, operation control command data inputted by an operator from the remote apparatus after the sending of the message, transferring the received operation control command data to the computer system, and transferring, via the network, to the remote apparatus message data on an operation of the computer system provided thereby after the sending of the message.

36. A remote operation control system according to claim 35, wherein the network is a public telephone network.

37. A remote operation control system according to claim 35, wherein said calling means includes means for calling a telephone communicator of the remote apparatus.

38. A remote operation control system according to claim 37, wherein said sending means includes means for sending a voice error message to the telephone communicator after the calling, and wherein the message sent by the sending means is the voice error message.

39. A remote operation control system according to claim 38, wherein said voice error message is indicative of an error detected by said detecting means.

40. A remote operation control system according to claim 35, wherein said transfer means includes:
means for keeping a telephone line established by the calling, and for thereafter receiving, through the line, operation control command data inputted by an operator through the remote apparatus after the sending of the error message, transferring the received operation control command data to the computer system, and transferring, through the line, to the remote apparatus message data on operation of the computer system provided thereby after the sending of the error message.

41. A remote operation control system for combination of a computer system and an operation console for the system, comprising:
detecting means connected to the computer system to receive message data on an operation of the computer system provided therefrom to said operation console for detecting whether or not an error has occurred within the computer system; and
calling means, connected to said detecting means and a telephone communication network and responsive to detection by said detecting means of occurrence of an error, for calling a remote apparatus connected to the network;
means for sending a message indicative of occurrence of an error to the remote apparatus after the calling; and
transfer means connected to the computer system, said operation console and the network for transferring via the network, to the computer system, operation control command data inputted from said operation console an operation control command data inputted from the remote apparatus after the calling, and for transferring message data on an operation of the computer system provided by the computer system after the calling both to the remote apparatus via the network and to the operation console.

42. A remote operation control system according to claim 41, wherein the network is a public telephone network.

43. A remote operation control system according to claim 41, wherein said calling means calls a telephone communicator of the remote apparatus.

44. A remote operation control system according to claim 41, wherein said means for sending sends a voice error message to a telephone communicator of the remote apparatus, after the calling, and wherein the message sent by the sending means is the voice error message.

45. A remote operation control system for a plurality of combinations, each comprised of a computer system and an operation console for the system, comprising:
a plurality of remote operation control means each provided for a corresponding one of the combinations, each remote operation control means being connected to a computer system and an operation console both belonging to a corresponding combination and each remote operation control means being connected to a telephone communication network, to which a predetermined remote apparatus is connected, wherein each operation control means includes detecting means, connected to a computer system belonging to a corresponding combination and responsive to message data on an operation thereof provided thereby for an operation console belonging to the corresponding combination, for detecting whether or not an error has occurred within the computer system,
calling means, connected to said detecting means and the network and responsive to detection by said detecting means of occurrence of an error, for calling the remote apparatus,
means for sending a message indicative of occurrence of an error to said remote apparatus, and
transfer means connected to the computer system and the network for subsequently transferring via the network to the computer system operation control command data inputted from the remote apparatus after the calling and for transferring via the network to the remote apparatus message data on an operation of the computer system provided thereby after the calling.

46. A remote operation control system according to claim 45, wherein the network is a public telephone network.

47. A remote operation control system according to claim 45, wherein said calling means calls a telephone communicator of the remote apparatus.

48. A remote operation control system according to claim 45, wherein said means for sending sends a voice error message to a telephone communicator of the remote terminal after the calling, and wherein the message sent by said sending means is the voice error message.

49. A remote operation control system for a combination of a computer system and an operational control therefor, comprising:
detecting means, connected to the computer system to receive message data on an operation of the computer system provided thereby to the operation control, for detecting whether or not an error has occurred within the computer system;
calling means, connected to said detecting means and to a telephone communication network and responsive to detection by said detecting means of occurrence of an error, for calling a predetermined telephone communicator connected to the network to inform an operator of occurrence of an error; and
transfer means connected to the computer system and the network for transferring through the network, to the computer system, operation control command data inputted after the calling from a remote terminal connected to the network and for transferring via the network message data on an operation of the computer system provided by the computer system after the calling to the remote terminal via the network.

50. A remote operation control system connected to a telephone network for control of a computer system, comprising:
holding means for holding a telephone number of a remote apparatus connected to the telephone network and authorized to input an operation control command to the computer system, and for holding an identifying information item assigned to an operator authorized to control the computer system;

operator identifying means connected to said holding means and the network, and responsive to an access request given by an operator through the network from a remote apparatus connected to the network for detecting whether an identifying information item inputted by the operator for the access request corresponds to the identifying information item in said holding means;

apparatus identifying means connected to said holding means and the network, responsive to detection of correspondence of the identifying information item inputted by said operator identifying means, for disconnecting said remote operation control system from the network, and for thereafter calling back the remote apparatus, based upon the telephone number held in said holding means and assigned to the identified operator; and transfer means connected to said apparatus identifying means and said network for transferring to the computer system an operation control command inputted from that remote apparatus after the calling back is successful.

51. A remote operation control system according to claim 50, wherein said holding means holds a plurality of identifying information items each for one of a group of authorized operators and a plurality of telephone numbers, each of the telephone numbers corresponding to one of the plurality of identifying information items and each of the telephone numbers representing a telephone number of an authorized remote apparatus assigned to an operator assigned with a corresponding identifying information item;

wherein said operator identifying means identifies whether the inputted identifying information item corresponds to one of the plurality of identifying information items held in said holding means; and wherein said apparatus identifying means calls back the remote apparatus, based upon one of the telephone numbers held in said holding means, corresponding to the identifying information item identified as corresponding to the inputted identifying information item.

52. A system according to claim 50, further comprising:

an operator-operable input apparatus for inputting an operation control command to said computer system;

wherein said transfer means includes means connected to said operator-operable input apparatus and said computer, for transferring the operation control command inputted through said input apparatus and said signal indicative of said operation control command inputted from said remote apparatus, to said computer system through a command input line connected to said computer system.

53. A system according to claim 50, further comprising:

means for holding messages to be sent to the remote apparatus; and means for sending one of said held messages to said remote apparatus before said remote operation control system is disconnected, wherein said one message has contents related to execution of the calling back.

54. A system according to claim 50, further including:

a transmitter/receiver connected to said network; wherein said apparatus identifying means includes:

means for execution the detecting, based upon a signal given by said transmitter/receiver and indicative of the identifying information;

means for requesting said transmitter/receiver to disconnect from said network; and means for requesting said transmitter/receiver to execute the calling back;

wherein said transfer means includes means interposed between said transmitter/receiver and said computer for transferring to said computer system a signal given by said transmitter/receiver and indicative of the operation control command.

55. A system according to claim 54, further comprising:

an operator-operable input apparatus for said computer system;

wherein said transfer means further includes means for transferring information inputted through said input apparatus and said information inputted from said remote apparatus to said computer system through a common input line connected to said computer system.

56. A remote access control system for a computer, comprising:

transmitter/receiver means, connected to a telephone network, for transmitting and receiving data via the telephone network;

memory means for storing a telephone number of a remote apparatus authorized to access the computer via telephone network and for storing an identifying information item assigned to an operator authorized to access the computer;

operator identifying means connected to said memory means and said transmitter/receiver means, responsive to an access request which includes operator identifying information given by an operator through the telephone network from a remote apparatus connected to the telephone network and delivered to the operator identifying means via the transmitter/receiver means, for determining whether the access request corresponds to the stored identifying information item;

apparatus identifying means, connected to said memory means and said transmitter/receiver means and responsive to a determination of correspondence between the operator identifying information and the stored identifying information, for supplying a signal to disconnect said transmitter/receiver means from the telephone network, and for thereafter requesting said transmitter/receiver means to call back the remote apparatus, based upon the stored telephone number; and transfer control means interposed between said transmitter/receiver means and said computer for controllably enabling a connection between the remote apparatus and the computer, and for transferring to the computer a signal given by said transmitter/receiver means indicative of information inputted from that remote apparatus after the callback is successful via the connection.

57. A remote operation control system according to claim 56, wherein said memory means stores a plurality of identifying information items each for one of a group of authorized operators and a plurality of telephone numbers, each of the telephone numbers corresponding to one of the plurality of identifying information items, and each of the telephone numbers representing a telephone number of an authorized remote apparatus assigned to an operator assigned with a corresponding identifying information item;

wherein said operator identifying means identifies whether the inputted identifying information item corresponds to one of the plurality of identifying information items stored in said memory means; and wherein said apparatus identifying means calls back the remote apparatus, based upon one of the telephone numbers stored in said memory means, corresponding to that one identifying information item which has been identified as corresponding to the inputted identifying information item.

58. A system according to claim 56, further comprising:

an operator-operable input apparatus for said computer system;

wherein said transfer means includes means for transferring information inputted through said input apparatus and said information inputted from that remote apparatus to said computer system through a common input line connected to said computer system.

59. A system according to claim 56, further comprising:

means for holding messages to be sent to the remote apparatus; and means for requesting said transmitter/receiver means to send a verbal one of said held messages to said remote apparatus, before the disconnect signal is supplied by said apparatus identifying means, wherein said one verbal message has contents related to execution of the callback.

60. A remote access control system as claimed in claim 56, wherein said transfer means includes means for controllably enabling the connection directly responsive only to the success of the callback.

61. A computing system with a remote operation control, comprising:

a computer site connected to a public telephone communication network; and a plurality of remote apparatuses connected to said public telephone communication network each including a terminal and telephone communicator;

wherein said computer site includes;

a computer system, and control means connected to said computer system and said public telephone communication network for remote operation control; wherein said control means includes:

means for receiving message data issued from the computer system for an operator of the computer system;

first storage means for storing error messages, each to be transmitted to the operator of the computer system at an occurrence of one error of a plurality of errors;

second storage means for storing telephone numbers of said remote apparatuses;

error detecting means responsive to the message data received by said means for receiving for checking whether or not the received message data indicates occurrence of the one error of the plurality of errors in the computer system;

means responsive to detection of occurrence of the one error in the computer system by said error detecting means for selecting a corresponding one of a plurality of error messages for the one error;

means connected to said error detecting means and responsive to detection of the one error thereby for calling-up a telephone communicator of one of the remote apparatuses by way of the public telephone communication network, based upon one of the stored telephone numbers;

means connected to the means for calling-up for sending the selected error message to the called-up telephone communicator by way of the public telephone communication network; and transfer control means for subsequently allowing command data and message data to be transferred between the one of the remote apparatuses and the computer system through the public telephone communication network.

62. A computing system with remote operation control, comprising:

a computer site connected to a telephone network; and a plurality of remote apparatuses connected to said network each including a terminal and telephone communicator;

wherein said computer site includes;

a computer system, and control means connected to said computer system and said network for remote operation control; wherein said control means includes:

means connected to the computer system for detecting an environmental abnormal state of at least one of air conditioning equipment and room temperature;

storage means for storing telephone numbers of said remote apparatuses;

means connected to said means for detecting and said storage means and responsive to detection of the environmental abnormal state for calling up a telephone communicator of one of the remote apparatuses, based upon one of the telephone numbers held in said storage means;

means connected to the means for calling-up for sending an error message indicative of occurrence of the environmental abnormal state to the one of the remote apparatuses by way of the network; and transfer control means connected to said means for sending for enabling subsequent transmission of command data and message data between the one of the remote apparatuses and the computer system.

63. A computing system with remote operation control, comprising:

a plurality of computer sites connected to a telephone network; and a plurality of remote apparatuses connected to said network each including a terminal and telephone communicator; wherein each computer site includes:

a computer system, and control means connected to said computer system and said network for remote operation control; wherein said control means included in each computer system includes:

means for receiving message data issued from a corresponding computer system for an operator of the corresponding computer system;

first storage means for storing error messages each to be transmitted to the operator of the corresponding computer system at an occurrence of one of a plurality of errors;

second storage means for storing telephone numbers of said remote apparatuses;

error detecting means responsive to the message data received by said means for receiving for checking whether or not the received message data indicates occurrence of the one of the errors in the computer system;

means responsive to detecting an occurrence of the one of the errors in the computer system by said error detecting means for selecting a corresponding one of the error messages for the one of the errors;

means connected to said error detecting means and responsive to detection of the one of the errors thereby for calling up a telephone communicator provided for one of the remote apparatuses by way of the network, based upon one of the stored telephone numbers;

means connected to the means for calling-up for sending the selected one of the error messages to the one of the remote apparatuses by way of the network; and transfer control means for subsequently allowing command data and message data to be transferred between the one of the remote apparatuses and the computer system through the network.

64. A computing system with remote operation control, comprising:

a computer site connected to a telephone network; and a remote operator terminal connected to the network; wherein each computer site includes:

a computer system, and control means connected to said computer system and said network for remote operation control; wherein said control means includes:

means, connected to the computer system and responsive to message data on an operation thereof provided by said computer system, for detecting whether or not an operation error has occurred within the computer system;

transfer means, connected to the computer system and the network, for transferring to the computer system operation control command data inputted subsequently by the remote terminal operator via said remote terminal and transmitted via the network, and for subsequently transferring message data on operation of the computer system to the remote terminal via the network.

65. A computing system with remote operation control, comprising:

a computer site connected to a telephone network; and a plurality of remote terminals connected to the network; wherein said computer site includes:

a computer system, and control means connected to said computer system and said network for remote operation control; wherein said control means includes:

means for holding a plurality of telephone numbers for telephone communicators connected to a telephone communication network and respectively provided for said plurality of predetermined remote terminals;

means connected to the computer system and responsive to computer system message data for detecting whether or not an operation error has occurred within the computer system;

means connected to said means for holding and said means for detecting and being responsive to detection of occurrence of an error thereby for selecting one of the telephone numbers;

means connected to said means for selecting and to the network for calling one of said telephone communicators with a selected one of the telephone numbers to inform an operator of occurrence of an operation error; and transfer means connected to the computer system and the network for transferring to the computer system operation control command data inputted subsequently by an operator from a remote terminal selected with the selected telephone number, and for transferring message data on an operation of the computer system provided subsequently, to the selected remote terminal via the network.

66. A computing system with remote operation control, comprising:

a computer site connected to a telephone network; and a remote terminal connected to said network; wherein said computer site includes:

a computer system, and control means connected to said computer system and said network for remote operation control; wherein said control means includes:

means, connected to the computer system and responsive to message data on an operation thereof provided thereby, for detecting whether or not an error has occurred within the computer system;

means, connected to said means for detecting and to a telephone communication network and responsive to detection by said means for detecting of occurrence of an error, for calling a telephone communicator connected to the network and provided for said remote terminal, to inform an operator of occurrence of an error;

means for sending a voice error message to the telephone number via the network after the calling; and transfer means connected to the computer system and the network for transferring to the computer system operation control command data inputted subsequently by an operator through the remote terminal and transmitted via the network, and for transferring message data on an operation of the computer system provided subsequently thereby, to the remote terminal via the network.

67. A computing system with remote operation control, comprising:

a computer site connected to a telephone network; and a remote terminal connected to said network; wherein said compute site includes:

a computer system, and control means connected to said computer system and said network for remote operation control; wherein said control means includes:

detecting means connected to said computer system and responsive to the message data on an operation thereof provided thereby for detecting whether or not an error has occurred within the computer system;

calling means connected to said detecting means and a telephone communication network and responsive to detection by said detecting means of occurrence of an error for calling said predetermined remote apparatus;

sending means connected to said calling means for sending a message to the remote apparatus to inform an operator of occurrence of an error; and transfer means connected to the computer system and the network for receiving, through the network, operation control command data inputted by an operator from the remote apparatus after the sending of the message, transferring the received operation control command data to the computer system, and transferring, via the network, to the remote apparatus message data on an operation of the computer system provided thereby after the sending of the message.

68. A computing system with remote operation control, comprising:

a computer site connected to a telephone network; and a remote apparatus connected to said network; wherein said compute site includes:

a computer system, and an operation console for said computer system;

control means connected to said computer system, said operation console and said network; wherein said control means includes:

detecting means connected to the computer system to receive message data on an operation of the computer system provided therefrom to said operation console for detecting whether or not an error has occurred within the computer system; and calling means connected to said detecting means and to a telephone communication network and responsive to detection by said detecting means of occurrence of an error, for calling said remote apparatus connected to the network;

means for sending a message indicative of occurrence of an error to the remote apparatus, after the calling; and transfer means connected to the computer system, said operation console and the network for transferring, via the network to the computer system, operation control command data inputted from said operation console and operation control command data inputted from the terminal of the remote apparatus after the calling, and for transferring message data on an operation of the computer system provided by the computer system after the calling both to the terminal via the network and to said operation console.

69. A computing system with remote operation control, comprising:

a plurality of computer sites connected to a telephone network;

a remote apparatus connected to said network; wherein each computer site includes:

a computer system;

an operation console for said computer system; and control means connected to said computer system, said operation console and said network; wherein said control means in each computer site includes:

detecting means connected to a computer system belonging to a corresponding combination and responsive to message data on an operation thereof provided thereby for an operation console belonging to the corresponding combination for detecting whether or not an error has occurred within the computer system, calling means connected to said detecting means and the network and responsive to detection by said detecting means of occurrence of an error for calling the remote apparatus, means for sending a message indicative of occurrence of an error to said remote apparatus, and transfer means connected to the computer system and the network for subsequently transferring via the network to the computer system operation control command data inputted from the terminal after the calling and for transferring via the network to the terminal called message data on an operation of the computer system provided thereby after the calling.

70. A computing system with remote operation control, comprising:

a computer site connected to a telephone network; and a remote terminal connected to said network; wherein said computer site includes:

a computer system, and an operational control for said computer system;

control means connected to said computer system, said operational control and said network; wherein said control means includes:

detecting means connected to the computer system to receive message data on an operation of the computer system provided thereby to the operational control for detecting whether or not an error has occurred within the computer system;

calling means, connected to said detecting means and to the network and responsive to detection by said detecting means of occurrence of an error, for calling a predetermined telephone communicator connected to the network, to inform an operator of occurrence of an error; and transfer means connected to the computer system and the network for transferring through the network, to the computer system, operation control command data inputted after the calling from said remote terminal and for transferring via the network message data on an operation of the computer system provided by the computer system after the calling to the remote terminal via the network.

71. A computing system with remote operation control, comprising:

a computer site connected to a telephone network; and a remote apparatus connected to said network; wherein said computer site includes:

a computer system, and control means connected to said computer system and said network for remote operation control; wherein said control means includes:

holding means for holding a telephone number of said remote apparatus and an identifying information item assigned to an operator authorized to control the computer system;

operator identifying means connected to said holding means and the network, and responsive to an access request given by an operator through the network from a remote apparatus connected to the network for detecting whether an identifying information item inputted by the operator for the access request corresponds to the identifying information item in said holding means;

apparatus identifying means connected to said holding means and the network, responsive to detection of correspondence of the identifying information item inputted by said operator identifying means, for disconnecting said control means from the network, and for thereafter calling back that remote apparatus, based upon the telephone number in said holding means and assigned to the identified operator; and transfer means connected to said apparatus identifying means and said network for transferring to the computer system an operation control command inputted from that remote apparatus after the calling back is successful.

72. A remote operational control system for a computer system, comprising:

means connected to the computer system to receive message data concerning an operation of the computer system, for detecting whether or not an error has occurred within the computer system, said message data being provided by said computer system to an operational console of said computer system; and means, connected to said detecting means and a telephone communication network and responsive to detection by said detecting means, of occurrence of an error for calling a predetermined telephone communicator connected to said network, to inform an operator of occurrence of an error;

wherein said detecting means includes means for detecting occurrence of a software error based upon message data given by an operating system which control said computer system to said operational console.

73. A remote operational control system according to claim 72, wherein said means for detecting occurrence of a software error includes:

means for holding a plurality of information items each corresponding to a plurality of software errors and each indicating information included in message data which will be provided by said operating system at occurrence of a corresponding software error within said computer system; and means for detecting whether message data actually provided by said operating system includes one of said plurality of held information items, 74. A remote operational control system according to claim 73, wherein each of said plurality of information items includes a combination of a particular message identifier and a message number.

75. A remote operational control system for a computer system, comprising:

means connected to the computer system to receive message data concerning an operation of the computer system, for detecting whether or not an error has occurred within the computer system, said message data being provided by said computer system to an operational console of said computer system; and means, connected to said detecting means and a telephone communication network and responsive to detection by said detecting means, of occurrence of an error for calling a predetermined telephone communicator connected to said network, to inform an operator of occurrence of an error;

wherein said detecting means includes means for detecting occurrence of a hardware error based upon message data given from a service processor included in said computer system to said operational console.

76. A remote operational control system according to claim 75, wherein said means for detecting occurrence of a hardware error includes means for executing the detecting based upon a program status word given as said message data from said service processor to said operational console.

77. A remote operational control system according to claim 76, wherein said means for detecting occurrence of a hardware error includes means for executing the detecting based upon a flag and a next address included in the program status word.

* * * * *